United States Patent
Marchandise et al.

(10) Patent No.: US 11,535,405 B2
(45) Date of Patent: Dec. 27, 2022

(54) ELECTRODYNAMIC ASSEMBLY FOR PROPELLING A SPACECRAFT IN ORBIT AROUND A STAR HAVING A MAGNETIC FIELD

(71) Applicant: SAFRAN AIRCRAFT ENGINES, Paris (FR)

(72) Inventors: Frederic Raphael Jean Marchandise, Moissy-Cramayel (FR); Laurent Godard, Moissy-Cramayel (FR); Benjamin Laurent, Moissy-Cramayel (FR); Michael Oberg, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 483 days.

(21) Appl. No.: 16/492,002

(22) PCT Filed: Mar. 6, 2018

(86) PCT No.: PCT/FR2018/050501
§ 371 (c)(1),
(2) Date: Sep. 6, 2019

(87) PCT Pub. No.: WO2018/162831
PCT Pub. Date: Sep. 13, 2018

(65) Prior Publication Data
US 2020/0071004 A1    Mar. 5, 2020

(30) Foreign Application Priority Data

Mar. 8, 2017   (FR) ..................... 17 00229

(51) Int. Cl.
*B64G 1/40*   (2006.01)
*B64G 1/10*   (2006.01)
(Continued)

(52) U.S. Cl.
CPC ............... *B64G 1/409* (2013.01); *B64G 1/10* (2013.01); *B64G 1/32* (2013.01); *B64G 1/62* (2013.01);
(Continued)

(58) Field of Classification Search
CPC . B64G 1/409; B64G 1/10; B64G 1/32; B64G 1/62; B64G 1/648; H02K 3/40;
(Continued)

(56) References Cited

U.S. PATENT DOCUMENTS 4,923,151 A * 5/1990 Roberts .................. B64G 1/421
244/167
6,049,042 A * 4/2000 Avellanet .............. B21C 37/045
174/128.1
(Continued)

FOREIGN PATENT DOCUMENTS

DE   197 19 523 A1   11/1998
DE   19719523 A1 *   11/1998 ............. B64G 1/421

OTHER PUBLICATIONS

International Search Report dated Jun. 18, 2018 in PCT/FR2018/050501 filed Mar. 6, 2018.
(Continued)

*Primary Examiner* — Medhat Badawi
*Assistant Examiner* — Vicente Rodriguez
(74) *Attorney, Agent, or Firm* — Oblon, McClelland, Maier & Neustadt, L.L.P.

(57) ABSTRACT

An electrodynamic assembly for propelling a spacecraft in orbit around a celestial body having a magnetic field is disclosed. The assembly includes a plurality of coaxial cables for an electrodynamic assembly for propelling a spacecraft in orbit around a celestial body having a magnetic field. Each coaxial cable includes an electrically conductive core surrounded by a first electrically insulating sheath, and
(Continued)

an electrically conductive current return circuit mounted outside the first electrically insulating sheath. The current return circuit includes a first end electrically connected to a first end of the core of the coaxial cable.

12 Claims, 4 Drawing Sheets

(51) Int. Cl.
  *B64G 1/32* (2006.01)
  *B64G 1/62* (2006.01)
  *H02K 3/40* (2006.01)
  *H02K 41/035* (2006.01)

(52) U.S. Cl.
  CPC ........... *H02K 3/40* (2013.01); *H02K 41/0358* (2013.01); *H02K 2203/15* (2013.01)

(58) Field of Classification Search
  CPC ........... H02K 41/0358; H02K 2203/15; H02K 41/00; H01B 11/18; H01B 11/1817; H01B 11/1834; H01B 11/1843; H01B 11/20
  See application file for complete search history.

(56) References Cited

U.S. PATENT DOCUMENTS

| | | | | |
|---|---|---|---|---|
| 6,755,377 | B1 * | 6/2004 | Levin | B64G 1/648 244/158.2 |
| 7,118,074 | B1 * | 10/2006 | Johnson | B64G 1/648 244/158.2 |
| 8,210,480 | B2 * | 7/2012 | Moorer | F03H 1/0025 244/158.6 |
| 2014/0262428 | A1 * | 9/2014 | Broughton, Jr | B64G 1/648 57/3 |
| 2016/0307666 | A1 * | 10/2016 | Kamidaki | H01F 5/00 |

OTHER PUBLICATIONS

Axon Cable, "High temperature cables for satellite electrical propulsion," Jan. 2016, pp. 1-2, URL: http://www.axon-cable.com/publications/High-temperature-cable-for-satellite.pdf, XP055434958.

* cited by examiner

ELECTRODYNAMIC ASSEMBLY FOR PROPELLING A SPACECRAFT IN ORBIT AROUND A STAR HAVING A MAGNETIC FIELD

BACKGROUND OF THE INVENTION

The invention relates to a compact electrodynamic cable for propelling a satellite in the orbit of planets having a magnetic field.

Subsequent to the French Law on Space Operations, it is necessary, for satellites in orbit around the Earth, to ensure that satellites in the "protected" orbit sections are de-orbited within no more than 25 years, in particular in the low orbit zone below 2000 km.

Various solutions are known to perform the de-orbiting of satellites, including so-called "space tether" solutions. Space tethering uses very strong electrodynamic cables, known as tethers, which are deployed over long lengths to be used here as drivers by transforming the electrical energy of the cable into kinetic energy. The movement of the tethers results from the expression of the Lorentz force exerted on this cable in the Earth's magnetic field, the movement of the tether being generated by the supply of the tether with a direct current. The Lorentz force is the electromagnetic force then experienced by the cable charged in the Earth's electromagnetic field, this force driving the movement of the cable.

The order of magnitude of the maximum Lorentz force on a cable with a length of 1000 m traveled by a current of 1 A is theoretically 30 mN in the Earth's orbit, which is comparable to what is done in ion or plasma electric propulsion.

These cables can also be used as a current generator under the natural effect of their tension in the Earth's electromagnetic field, which can be high and proportional to their length.

The integration of these electrodynamic tethers into a satellite requires an infrastructure on the satellite that is complex to implement, in particular due to the deployment mechanism, the long length of the cables to be wound/unwound, the cable end constituting a mini satellite with an electron transmitter (cathode), the mechanical dynamics of the two satellites and the wire connecting them in the orbit being complex and sometimes dangerous, as well as the random conductivity of the ambient plasma also depending on the solar spatial weather.

The deployment in orbit of tethers is often delicate because they must be lightweight despite the very long length of the cable. The mechanical dynamics are critical due to the need to perform a current return by a cathode to the other end, which is part of a piece of equipment related to a second connected satellite and which uses the ambient plasma as current return. The return by the ambient plasma can further generate other constraints in that strong currents not acceptable by the wire can be generated due to the conduction of the ambient plasma and the charge of the satellite.

Furthermore, the space tether solutions using tethers make it possible to provide assistance or a solution without chemical propulsion when satellites arrive close to planets having a magnetic field. For Jupiter, the JUICE probe must provide a speed differential Δv of 900 m/s in the current fully chemical configuration.

Plasma propulsion alone generally requires a supply energy that often cannot be found on site due to the insufficient production efficiency of solar panels, the low power of radioisotope thermionic generators (RTG). The electrodynamic tethers make it possible both to supply energy to a plasma motor and to contribute to deceleration for placement in orbit.

It has in particular been shown, in the article IEPC-2015-065 "Electric Propulsion for deep space: a study case "Jupiter Icy Moon" with EP", that electric propulsion with Hall effect could reduce the mass of the initial satellite from 5000 kg to 2500 kg and that the need in Av upon arriving near Jupiter could be reduced to 520 m/s.

SUBJECT MATTER AND BRIEF DESCRIPTION OF THE INVENTION

The invention aims to offset the aforementioned drawbacks by providing a coaxial cable and an electrodynamic assembly configured to be placed on board a spacecraft and allowing a current return protected from ambient electrical disturbances.

One object of the invention proposes a coaxial cable for an electrodynamic assembly for propelling a spacecraft in orbit around a celestial body having a magnetic field, the cable comprising an electrically conductive core surrounded by a first electrically insulating sheath.

According to one general feature of the invention, the coaxial cable further comprises a current return circuit made from an electrically conductive and magnetically conductive material mounted outside the first electrically insulating sheath, the current return circuit including a first end electrically connected to a first end of said core of the cable.

The coaxial cable according to the invention makes it possible to have a current return not subject to the electromagnetic variations of the ambient plasma, since the current return is done through the solid electrical conductor of the current return circuit and not via the ambient plasma in the environment of the coaxial cable.

According to a first aspect of the coaxial cable, the coaxial cable can further comprise a coating made from a magnetically conductive material surrounding said first electrically insulating sheath.

The coating made from a magnetically conductive material makes it possible to produce an outer magnetic shield reducing the electromagnetic disturbances perceived by the core of the coaxial cable.

The electrically conductive and magnetically conductive material of the return circuit can be pmetal or soft iron.

According to a second aspect of the coaxial cable, the current return circuit comprises an electrically conductive wire.

In a first variant of the second aspect of the coaxial cable, the current return circuit can be formed by said coating made from magnetically conductive material surrounding said first electrically insulating sheath.

The use of a coating rather than a wire makes it possible to reduce the total mass of the cable.

According to a second variant of the second aspect of the coaxial cable, the current return circuit can comprise a layer of copper or gold arranged on the coating made from magnetically conductive material.

Pure iron being less conductive than copper, making the return circuit using a coating, for example made from iron or mu-metal, and a layer of copper covering the iron, makes it possible to improve the electric conduction of the return circuit while reducing the thickness of the return circuit, and thus to have a return circuit having a small enough thickness to limit the weight while allowing the presence of a magnetic field with sufficient braking. The additional coating can be deposited chemically or electrolytically.

According to a third aspect of the coaxial cable, the cable can further comprise a second electrically insulating sheath surrounding the current return circuit.

The second electrically insulating sheath makes it possible to protect the current return circuit from any electrical disturbance.

Another object of the invention proposes an electrodynamic assembly for the propulsion of a spacecraft in orbit around a celestial body having a magnetic field.

According to one general feature of the electrodynamic assembly according to the invention, the latter comprises at least one coaxial cable as defined above.

The insensitivity to the magnetic field of the ambient plasma of the current return of the coaxial cable makes it possible to improve the efficiency of the assembly and thus to reduce the length of the assembly. The reduction of the length necessary for the operation makes it possible to avoid using a tether and thus to do away with the problems associated with the use of an electrodynamic tether, in particular the problems relative to its deployment or to its kinematics.

According to a first aspect of the electrodynamic assembly, the assembly can comprise a serial coupling of the coaxial cables.

The serial coupling of the coaxial cables of the sheath thus allows a placement in series of the cores and of the return circuits of the cables such that if a current circulates, the return circuits all see the same current direction and the cores all see the same current direction, which is the direction opposite the circulation direction in the return circuits.

According to a second aspect of the electrodynamic assembly, the coaxial cables can be grouped together to form at least one bundle in order to increase the interaction surface with the magnetic field over a same electrodynamic assembly length.

The bundle configuration makes it possible to increase the current generated by the magnetic field for a same assembly length, and thus to reduce the useful assembly length proportionately for the desired current power.

In a first embodiment, each coaxial cable can have a length corresponding to the length of the electrodynamic assembly. In a second embodiment, the electrodynamic assembly comprises a plurality of bundles aligned successively to form the length of the electrodynamic assembly.

According to a third aspect of the electrodynamic assembly, the assembly can comprise an input terminal formed by a second free end of the core of a coaxial cable and an output terminal formed by a second free end of the return circuit of another coaxial cable.

The input terminal and the output terminal are intended to be coupled to the terminals of an electric alternator configured in order, in a first embodiment, to deliver an electric current in the assembly when a spacecraft with which the assembly is associated must be de-orbited and, in a second embodiment, to transfer the current delivered by the electrodynamic assembly in reaction to the interaction of the magnetic field of the celestial body with the magnetically conductive surfaces of the electrodynamic assembly in energy storage means, such as a battery.

Still another object of the invention proposes a spacecraft able to be orbited around a celestial body having a magnetic field, the spacecraft comprising an electrodynamic assembly as defined above.

BRIEF DESCRIPTION OF THE DRAWINGS

The invention will be better understood upon reading the following, for information but non-limitingly, in reference to the appended drawings, in which.

DETAILED DESCRIPTION OF EMBODIMENTS

Figure 1:
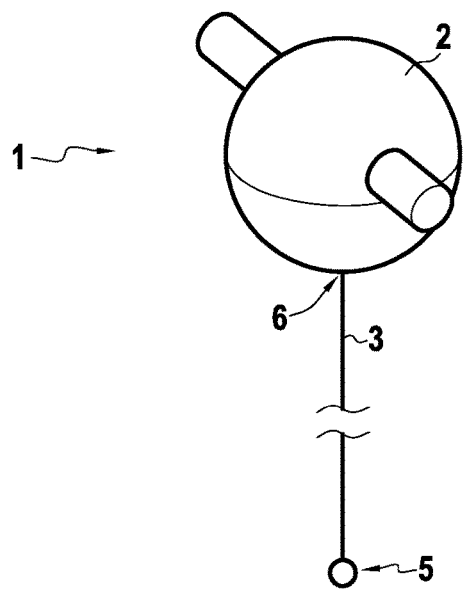
FIG. 1 shows a schematic illustration of a spacecraft provided with an electrodynamic assembly according to the invention.

FIG. 1 shows a schematic illustration of a spacecraft 1 provided with an electrodynamic assembly according to the invention.

The spacecraft 1 comprises an artificial satellite 2 including an electric generator and able to include chemical or other directional propulsion means, the artificial satellite 2 further comprising an electrodynamic assembly 3 with a length of 1000 m and extending between a first free end 5 of the electrodynamic assembly 3 and a second end 6 fastened to the artificial satellite 2.

As illustrated in FIGS. 2A, 2B, 2C and 2D, which each show a perspective view of an electrodynamic assembly 3 respectively according to a first, second, third and fourth embodiment of the invention, the electrodynamic assembly 3 comprises several coaxial cables 7 assembled in a bundle, each coaxial cable 7 having a tether corresponding to the length of the electrodynamic assembly 3.

In the four embodiments illustrated in FIGS. 2A to 2D, each coaxial cable 7 comprises an electrically conductive central core 8 surrounded by a first electrically insulating sheath 9. The core 8 is made from copper or from another electrically conductive metal such as gold or silver, for example.

The first sheath 9 is covered on its outer face by a coating 10 made from a magnetically conductive material, such as pmetal or soft iron, for example. The coating 10 made from magnetically conductive material makes it possible to make the inner part of the coaxial cable 7, where the inner conductor is located, that is to say the core 8, not particularly sensitive to the surrounding magnetic fields.

In the four embodiments illustrated in FIGS. 2A to 2D, each coaxial cable 7 further comprises a an electrically conductive current return circuit 11. The current return circuit 11 has a first and a second end respectively denoted 111 and 112, and the core 8 has a first and a second end respectively denoted 81 and 82. The first end 81 and 111 of the core 8 and the current return circuit 11 are at a same first end of the bundle, and the second ends 82 and 112 of the core 8 and the current return circuit 11 are a same second end of the bundle. For each coaxial cable 7 of the bundle, the second end 82 of its core 8 is electrically connected to the second end 112 of its current return circuit 11.

The coaxial cables 7 of the electrodynamic assembly 3 thus make it possible to perform a return not by the ambient plasma, but by the coaxial cable 7 itself by using a design where only the external element, i.e., the current return circuit 10, is subject to the Earth's magnetic field, since only the axis 8 inserted into the first sheath 9 is inside the magnetically conductive coating 10 forming a magnetic shielding.

Figure 2A:
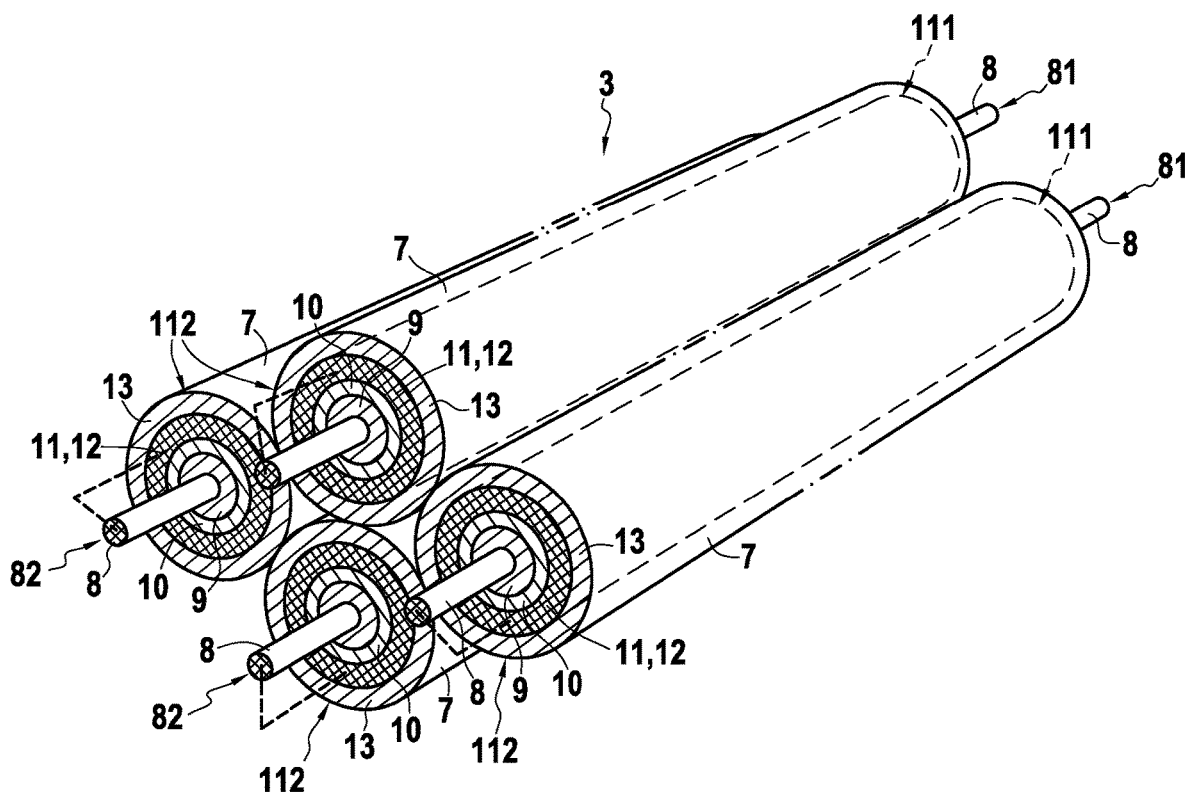
FIGS. 2A, 2B, 2C and 2D each show a perspective view of an electrodynamic assembly according to a first and a second embodiment of the invention.

In the first embodiment illustrated in FIG. 2A, the current return circuit 11 is formed by a layer 12 of electrically conductive material, such as a layer of copper, arranged, by chemical deposition, on the coating 10 so as to cover the coating 10. Furthermore, each coaxial cable 7 further comprises a second electrically insulating sheath 13 covering the current return circuit 11. The second electrically insulating sheath 13 makes it possible to electrically insulate each of the coaxial cables 7 of the bundle from the other coaxial cables 7 of the bundle, and more particularly to insulate the current return circuit 11 of one coaxial cable 7 from the current return circuit 11 of another coaxial cable 7. The coaxial cables 7 of a bundle are electrically insulated with the exception of the electrical connections made between the current return circuit 11 of a coaxial cable 7 and the core 8 of another coaxial cable, as illustrated in FIGS. 2A to 2D, 3 and 4.

Figure 2B:
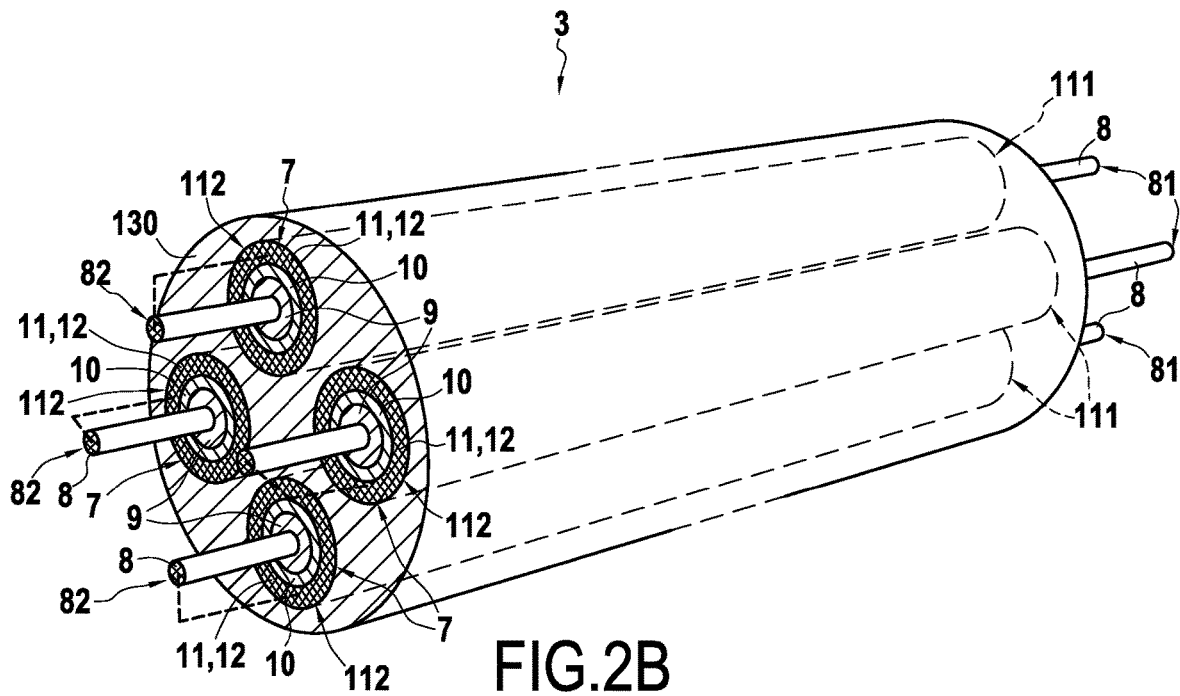

The second embodiment illustrated in FIG. 2B differs from the first embodiment illustrated in FIG. 2A in that the electrical insulation of the current return circuits 11 of each coaxial cable 7 is done not using a second sheath 13 for each coaxial cable 7, but using a single sheath 130 in which each coaxial cable 7 is embedded in the ground.

Figure 2C:
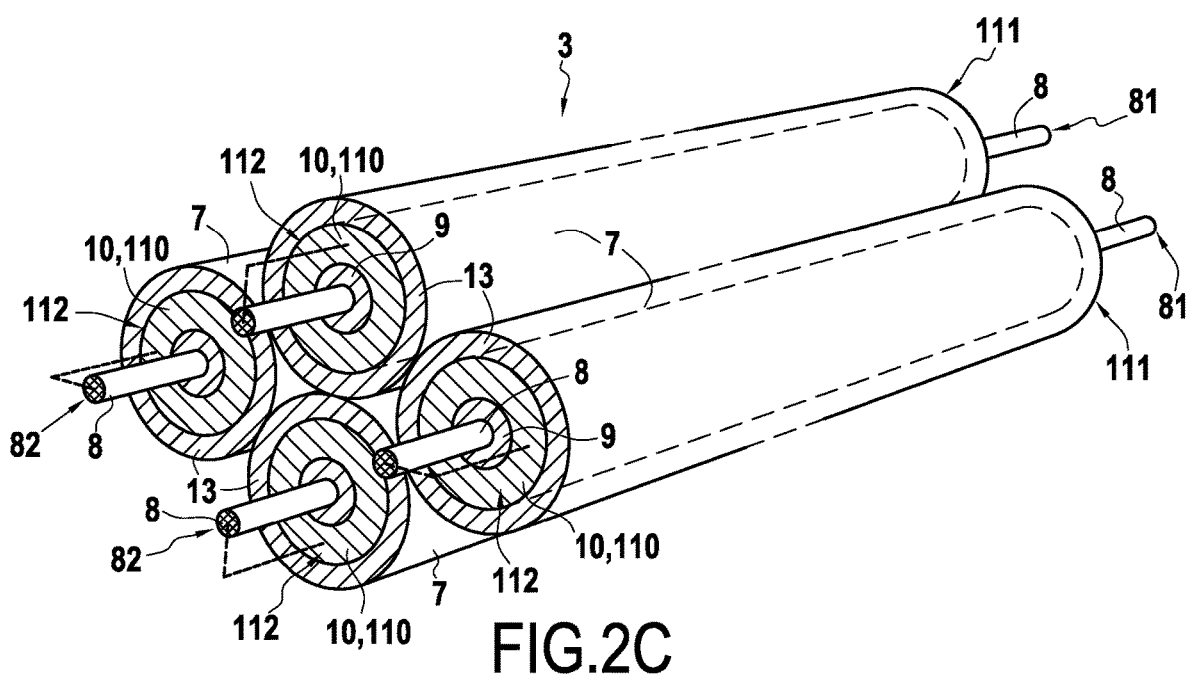

The third embodiment illustrated in FIG. 2C differs from the first embodiment illustrated in FIG. 2A in that the current return circuit 110 is formed by the coating 10, the material of the coating 10 being magnetically conductive and electrically conductive. The coating 10 can for example be made from soft iron. Soft iron is not as good an electrical conductor as copper, such that the current return circuit 110 has an electrical conduction comparable to that of the current return circuit 11 of the first embodiment, the thickness of the coating 10 in the third embodiment being better than that of the coating in the first embodiment.

Figure 2D:
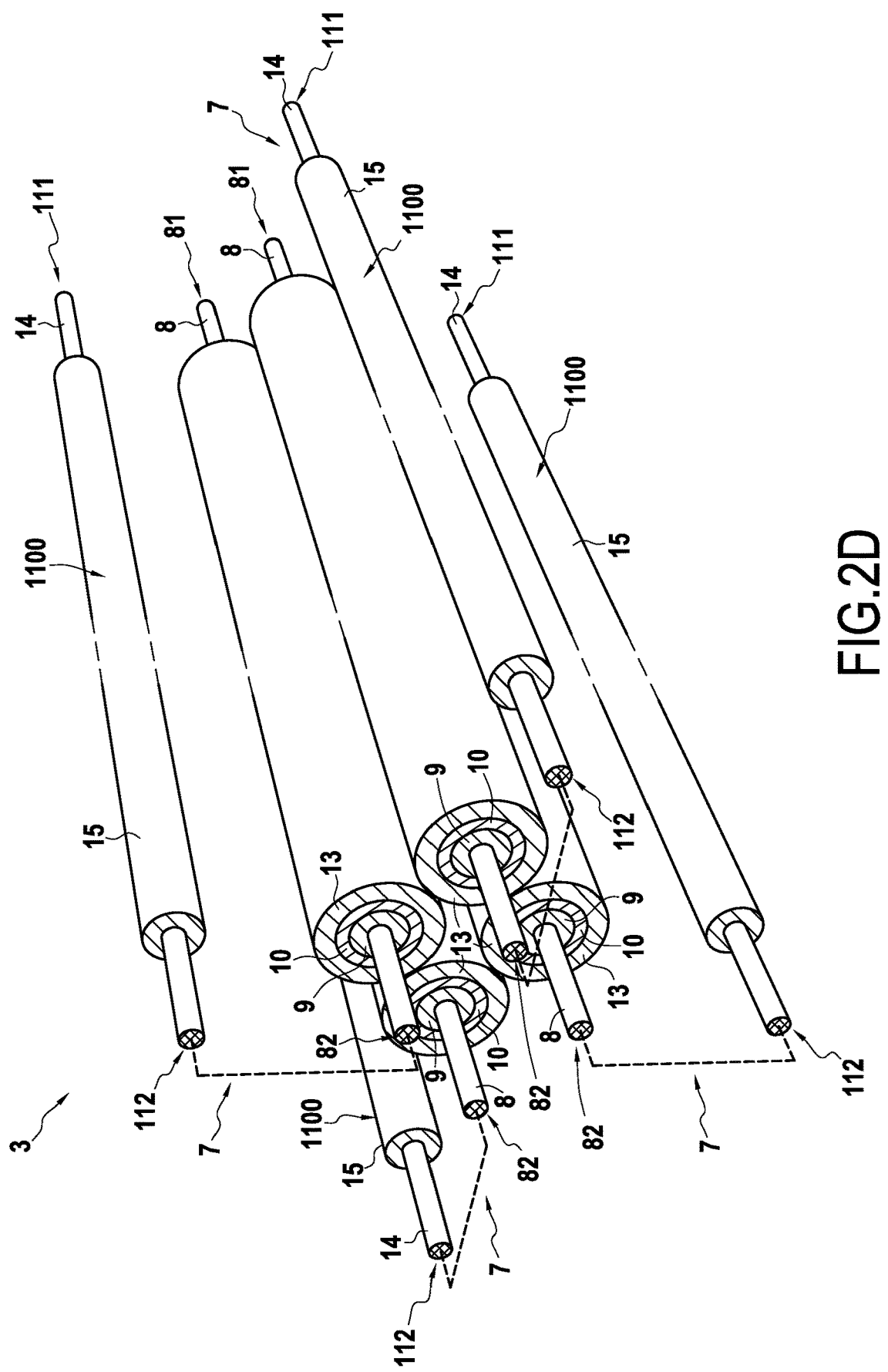

The fourth embodiment illustrated in FIG. 2D differs from the first embodiment illustrated in FIG. 2A in that the current return circuit 1100 comprises an electrically conductive wire 14 coated by an electrical insulation 15 instead of the layer of copper 12, the second electrically insulating sheath 13 being mounted directly on the magnetically conductive coating 10. The electrical wire 14 is kept outside the magnetic shielding and preferably on the outside of the bundle in order to stay in the space sensitive to the surrounding magnetic field.

Figure 3:
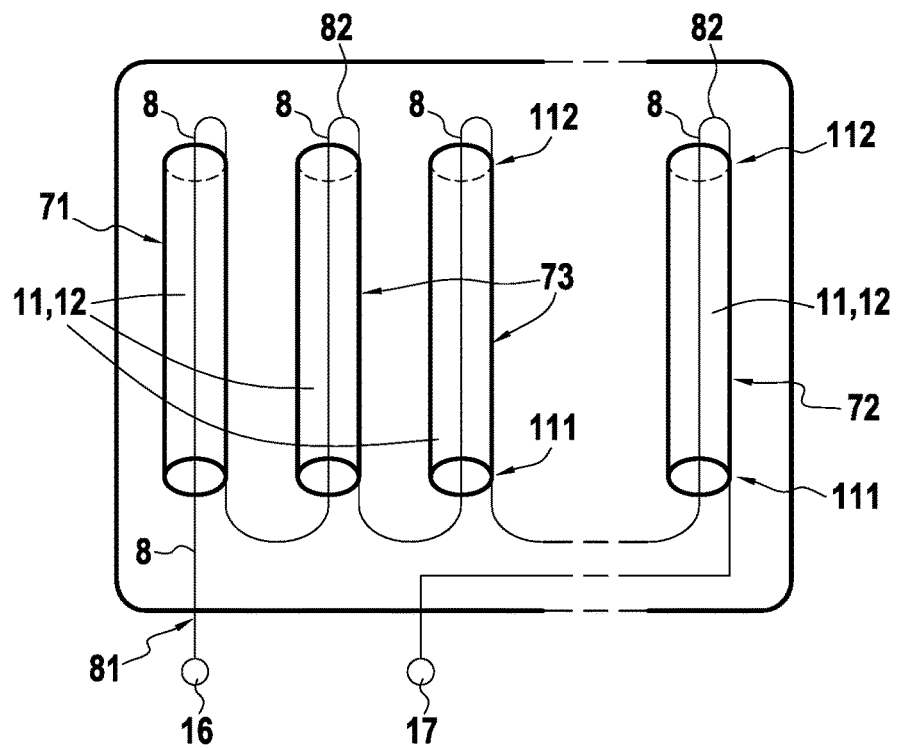
FIG. 3 illustrates an electrical diagram of coupling of the coaxial cables of the electrodynamic assembly according to the first and second embodiments of the invention.

FIG. 3 shows an electrical coupling diagram of the coaxial cables 7 of the electrodynamic assembly 3 according to the first, second and third embodiments of the invention. As shown, the coaxial cables 7 of the electrodynamic assembly 3 are electrically coupled in series to form a circuit in series with an input terminal 16 connected to a first end 81 of the core 8 of the first coaxial cable 71 and an output terminal 17 connected to a first end 111 of the current return circuit 11 of a second coaxial cable 72.

Each coaxial cable 73 between the first coaxial cable 71 and the second coaxial cable 72 comprises a second end 82 of its core 8 electrically coupled to a second end 112 of its current return circuit 11, the first end 111 of the current return circuit 11 of a coaxial cable 73 being electrically coupled to the first end 81 of the core 8 of a following coaxial cable and the first end 81 of the core 8 of a coaxial cable 73 being electrically coupled to the first end 111 of the current return circuit 11 of a preceding coaxial cable.

The cores 8 and the current return circuits 11 of the coaxial cables 7 are thus electrically coupled in series such that if a current circulates, the current return circuits 11 all see the same current direction and the cores 8 all see the same direction opposite the current return circuits 11.

In the first and second embodiments illustrated in FIGS. 2A and 2B, the current return circuit 11 of a coaxial cable 7 comprises an electrically conductive coating layer 12 covering the coating 10 with magnetically conductive material that covers the first insulating sheath 9 of the coaxial cable 7.

In the third embodiment, the return circuit 110 of a coaxial cable 7 is formed directly by the coating 10, which is formed at least partially by an electrically conductive and magnetically conductive material.

Figure 4:
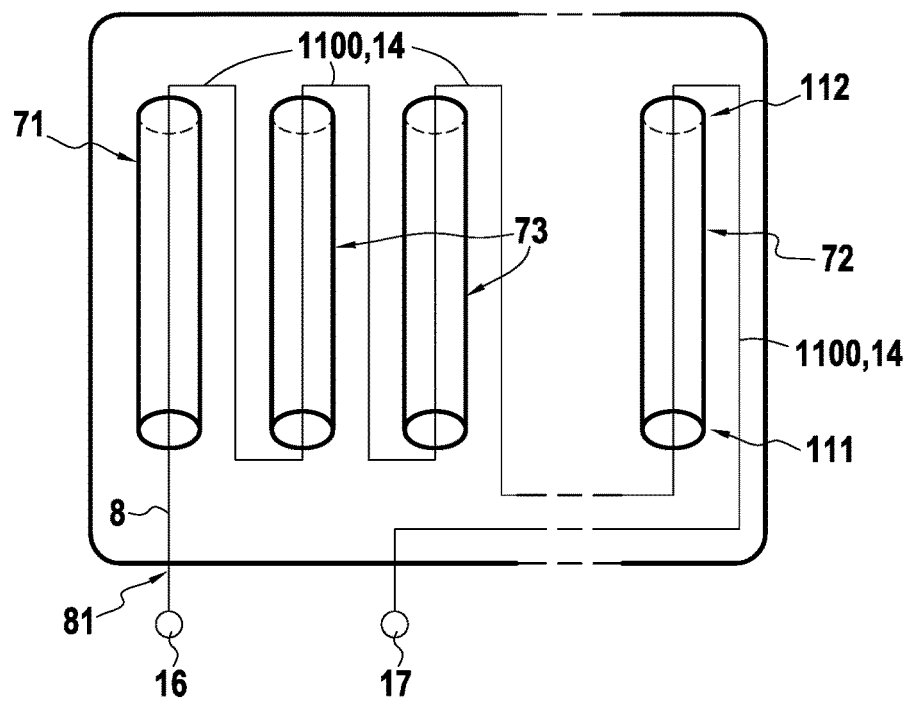
FIG. 4 illustrates an electrical diagram of coupling of the coaxial cables of the electrodynamic assembly according to a third embodiment of the invention.

FIG. 4 shows an electrical coupling diagram of the coaxial cables 7 of the electrodynamic assembly 3 according to the fourth embodiment of the invention illustrated in FIG. 2D. In this fourth embodiment, the current return circuit 1100 of the coaxial cables 7 is done by the connected, nonprotected wire 14 of the ambient magnetic field.

In all four embodiments, the diameter of the core 8 of the coaxial cables varies between 0.08 mm and 11.7 mm as a function of the current to be passed in the core 8, and the thickness of the first and second electrically insulating sheaths 9 and 13 is approximately 0.1 mm for a voltage of 1000 V.

In the first and second embodiments, the coating 10 forming the magnetic barrier has a thickness on the order of 0.1 mm for a land application, i.e., for an electrodynamic assembly 3 intended to be mounted on a satellite 2 for use in the Earth's magnetic field, and the copper layer 12 has a thickness varying between less than 0.01 mm and 2.3 mm.

The artificial satellite 2 being movable in the Earth's magnetic field, its speed v combined with the presence of a magnetic field B will create, on the return circuits 10, a voltage proportional to their length.

Indeed, on the charge carriers with charge q, in particular the electrons, the Laplace equation applies: $F=q(E+v \times B)$, with F the Lorentz force exerted by a magnetic field B on a conductor traveled by charges q generating a current producing an electric field E, and v the speed of the artificial satellite 2.

If the conductor is not connected to both sides, one has, at equilibrium: $F=0$ and $E=-v \times B$.

One also has $E=-\text{grad } V=\partial V/\partial x$.

There is therefore a voltage across the terminals of the conductor depending on the length and maximum norm corresponding to the product of the norm of the magnetic field with the speed v of the artificial satellite 2 and the length of the electrodynamic assembly 3, or $B*v*L$. The voltage depends on the relative position of the movement directions of the artificial satellite 2, the magnetic field B, and the direction of the coaxial cables 7. For example, it will be nil if B is collinear to v and will be maximal if v and B are orthogonal.

This voltage will generate current once the circuit is closed: the cores 8 ensure a current return toward the next coaxial cable 7 that is only very partially subject to the magnetic field B and therefore does not create a significant counter-electromotive force.

The return current by the cores 8 is limited by the voltage of the electric resistance of the core 8.

The coaxial cables 7 being numerous, this creates a direct current that also generates Laplace force opposing the speed v of the artificial satellite 2. This is a good way to create a force on the order of 1 to 100 mN continuously that can be used for the orbiting.

When the circuit is open, a voltage is created. Measuring it makes it possible to determine the local magnetic field in the direction orthogonal to the cables-satellite speed plane.

It is then possible, by grouping together 3 sets of orthogonal cables, to produce a braking propulsion that can be modulated as a function of the measurement (by acting on carefully positioned switches) and taking into account the relative speed.

The invention thus provides an electrodynamic assembly configured to be placed on board a spacecraft and allowing a current return protected from ambient electric disturbances.

The invention claimed is:

1. An electrodynamic assembly for propelling a spacecraft in orbit around a celestial body having a magnetic field, the electrodynamic assembly comprising:
   a plurality of coaxial cables, each coaxial cable comprising an electrically conductive core surrounded by a first electrically insulating sheath,
   wherein each coaxial cable further comprises an electrically conductive current return circuit mounted outside the first electrically insulating sheath, the current return circuit including a first end electrically connected to a first end of said core of the coaxial cable,
   wherein the coaxial cables are electrically coupled in series such that when a current circulates, the current return circuits see a same current direction and the cores all see a same direction opposite the current return circuits, and
   wherein the electrodynamic assembly extends between a first free end of the electrodynamic assembly and a second end fastened to the spacecraft.

2. The electrodynamic assembly according to claim 1, wherein each coaxial cable further comprises a coating made from a magnetically conductive material surrounding said first electrically insulating sheath.

3. The electrodynamic assembly according to claim 2, wherein the current return circuit comprises a layer of copper or silver arranged on the coating made from magnetically conductive material.

4. The electrodynamic assembly according to claim 1, wherein the current return circuit of each coaxial cable comprises an electrically conductive wire.

5. The electrodynamic assembly according to claim 2, wherein the current return circuit of each coaxial cable is formed by said coating made from magnetically conductive material surrounding said first electrically insulating sheath.

6. The electrodynamic assembly according to claim 1, wherein each coaxial cable further comprises a second electrically insulating sheath surrounding the current return circuit.

7. The electrodynamic assembly according to claim 1, wherein the coaxial cables are placed in bundles.

8. The electrodynamic assembly according to claim 1, further comprising an input terminal formed by a second free end of the core of a coaxial cable and an output terminal formed by a second free end of the current return circuit of another coaxial cable.

9. A spacecraft able to be orbited around a celestial body having a magnetic field comprising an electrodynamic assembly according to claim 1.

10. The electrodynamic assembly according to claim 1, wherein the plurality of coaxial cables are electrically insulated except for electrical connections between the current return circuit of a coaxial cable of the plurality of coaxial cables and the core of another coaxial cable of the plurality of coaxial cables.

11. The electrodynamic assembly according to claim 1, wherein a length of the electrodynamic assembly is 1000 m.

12. The electrodynamic assembly according to claim 1, wherein a diameter of the core of the plurality of coaxial cables is between 0.08 mm and 11.7 mm.

* * * * *